United States Patent
Satake et al.

(10) Patent No.: US 7,413,766 B2
(45) Date of Patent: Aug. 19, 2008

(54) ANTISTATIC OPTICAL FILM, METHOD FOR MANUFACTURING THE SAME AND IMAGE VIEWING DISPLAY

(75) Inventors: Masayuki Satake, Ibaraki (JP); Akiko Ogasawara, Ibaraki (JP); Fumiaki Shirafuji, Ibaraki (JP); Toshitsugu Hosokawa, Ibaraki (JP); Shinichi Inoue, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 10/824,797

(22) Filed: Apr. 15, 2004

(65) Prior Publication Data

US 2004/0209007 A1    Oct. 21, 2004

(30) Foreign Application Priority Data

Apr. 21, 2003   (JP)   ............................. 2003-115676
Mar. 15, 2004   (JP)   ............................. 2004-072811

(51) Int. Cl.
    *B05D 5/06* (2006.01)
(52) U.S. Cl. .................. 427/162; 427/163.1; 428/1.1; 428/1.3; 428/1.4; 428/1.5; 428/1.54; 349/40; 349/96; 349/122
(58) Field of Classification Search ................. 428/1.1, 428/1.3, 1.31, 1.4–1.5, 1.54; 349/40, 96, 349/122; 427/163.1
    See application file for complete search history.

(56) References Cited

U.S. PATENT DOCUMENTS

| 5,300,575 | A  |   | 4/1994  | Jonas et al. |          |
|-----------|----|---|---------|--------------|----------|
| 5,391,472 | A  | * | 2/1995  | Muys et al.  | 430/527  |
| 5,700,623 | A  | * | 12/1997 | Anderson et al. | 430/256 |
| 5,880,800 | A  | * | 3/1999  | Mikura et al. | 349/122 |
| 5,993,694 | A  |   | 11/1999 | Ito et al.   |          |
| 6,068,794 | A  | * | 5/2000  | Kobayashi et al. | 252/585 |
| 6,128,061 | A  | * | 10/2000 | Lee et al.   | 349/141  |
| 6,197,418 | B1 | * | 3/2001  | Cloots et al. | 428/332  |
| 6,310,133 | B1 | * | 10/2001 | Katashima et al. | 524/496 |
| 6,503,581 | B1 | * | 1/2003  | Shibue et al. | 428/1.1  |
| 6,504,587 | B1 | * | 1/2003  | Morishita et al. | 349/58 |
| 6,914,139 | B2 | * | 7/2005  | Mukunoki et al. | 536/124 |
| 6,965,418 | B2 | * | 11/2005 | Hara         | 349/40   |

FOREIGN PATENT DOCUMENTS

| JP | 62-239108 | 10/1987 |
|----|-----------|---------|
| JP | 2-73307   | 3/1990  |
| JP | 4-124601  | 4/1992  |
| JP | 2636968   | 4/1997  |

(Continued)

OTHER PUBLICATIONS

English translation of JP10-217379; JPO machine translation; 8 pages; 2007.*

(Continued)

*Primary Examiner*—Alain L Bashore
(74) *Attorney, Agent, or Firm*—Knobbe Martens Olson & Bear LLP (57) ABSTRACT

An antistatic optical film comprising an antistatic layer laminated on at least one side of an optical film, wherein the antistatic layer comprises a water soluble or a water dispersible conductive polymer, has excellent antistatic effect, optical characteristics and appearance.

13 Claims, 1 Drawing Sheet

FOREIGN PATENT DOCUMENTS

| | | |
|---|---|---|
| JP | 10-007795 | 1/1998 |
| JP | 10-142593 | 5/1998 |
| JP | 10-212373 | 8/1998 |
| JP | 10-217379 | 8/1998 |
| JP | 2002-180052 | 6/2002 |
| JP | 2002-258047 | 9/2002 |
| JP | 2003-246874 | 9/2005 |
| KR | 2004-0020085 | 4/2004 |

OTHER PUBLICATIONS

Information Supplement submitted to the Japanese Patent Office on the corresponding Japanese Patent Application No. 2004-72811, dated Oct. 24, 2006; no translation.

Chinese Office Action issued on the corresponding Chinese Patent Application No. 2004100369027, dated Feb. 9, 2007.

Office Action issued on the corresponding Korean Patent Application No. 10-2004-0026717.

* cited by examiner

ANTISTATIC OPTICAL FILM, METHOD FOR MANUFACTURING THE SAME AND IMAGE VIEWING DISPLAY

BACKGROUND OF THE INVENTION

1. Field of the Invention

The present invention relates to an antistatic optical film comprising an antistatic layer laminated on at least one side of an optical film, and a method for manufacturing the same. Furthermore, it relates to an image viewing display using the above-mentioned antistatic optical film, such as liquid crystal displays (LCDs), organic electroluminescence viewing displays, and PDPs. As the optical films, a polarizing plate, a retardation plate, an optical compensation film, a brightness enhancement film, etc., and furthermore optical films with the films laminated to each other may be mentioned.

2. Description of the Related Art

In liquid crystal displays etc., an image forming system necessarily requires polarizing elements disposed on both sides of a liquid crystal cell, and in general, polarizing plates are adhered thereto. Moreover, in liquid crystal panels, in order to improve display quality of displays, various optical elements in addition to the polarizing plates are increasingly used. For example, retardation plates for prevention of coloring, viewing-angle expansion films for improving viewing angle of liquid crystal displays, and furthermore, brightness enhancement films for increasing contrast of displays etc. are used. These films are generically named and called optical films.

In case of adhesion of the optical films to liquid crystal cells, pressure sensitive adhesives are usually used. Moreover, in adhesion between optical films and liquid crystal cells, and between optical films, each element usually is attached using pressure sensitive adhesives in order to reduce loss of light.

In these optical films, in order to prevent occurrence of damage and contamination to a surface of the optical film in transportation or manufacturing process until it is sent to consumers, surface protective films are usually attached on a surface thereof. The surface protective film is attached from a stage in which the optical film is in a state of single substance, and in some case it is peeled after being attached onto an LCD etc., and furthermore in other cases it is attached again after peeled to a same or another surface protective film. And there have been problems that static electricity generated in case of peeling of the surface protective film may destroy circuits, such as in LCD panels.

Although ITO treatment is usually performed on a cell substrate of one side of liquid crystal cell in case of LCD especially driven by IPS mode, antistatic treatment is not performed to an opposite side. For this reason, when a surface protective film is further removed from an optical film attached on a side without ITO treatment, separation electrification is generated, causing to occurrence of disorder of pictures. There are problems, also in a stage of completed panel finished products, that electrification is generated by wiping of pollution on a surface by cloths etc. in optical films of viewing side (upper side), or by contact with a diffusion film in the optical film of incidence side (lower side), resulting in disorder of pictures. Also in case of LCD driven by VA mode, when a cell substrate without ITO treatment given is used on one side of a liquid crystal cell, same problems occur.

In order to solve the above-mentioned problems, disclosed are a polarizing plate with an antistatic film having an antistatic film currently formed on a surface thereof (Japanese Patent Laid-Open No. 2-73307 official report), and a polarizing plate having a transparent conductive layer(s) prepared on one side or both sides thereof (Japanese Patent Laid-Open No. 4-124601 official report).

SUMMARY OF THE INVENTION

As conventional methods for forming an antistatic layer on a surface of an optical film, there is preferably used a method in which an antistatic layer is formed by applying a resin solution for an antistatic layer is applied onto a surface of the optical film and then dried. A technology of Japanese Patent Laid-Open No. 2-73307 official report also forms an antistatic layer by coating an antistatic coating material or a hard coating agent with an antistatic agent blended therein on a surface of a polarizing plate. However, when materials of surfaces of such as a polarizing plate with antistatic layer laminated thereon is formed of materials such as polycarbonates and norbornene based resins that are soluble in organic solvents and that have inferior organic solvent-proof property to organic solvents, coating to polarizing plate of an antistatic agent including organic solvents in the above Patent Literature causes change in quality and deterioration of the polarizing plate etc. by the organic solvents, and, occasionally has adverse influence on optical characteristics.

Moreover, although a technology of Japanese Patent Laid-Open No. 4-124601 official report forms a transparent conductive layer using a material such as tin oxide, indium oxide, gold, or silver by a vacuum deposition method, a sputtering method, or an ion plating method, these methods have problems that manufacturing cost is higher as compared with applying methods, such as coating methods, and has inferior productivity.

The present invention aims at providing an antistatic optical film, which has excellent antistatic effect, optical characteristics and appearance, comprising an antistatic layer laminated on at least one side of an optical film. Moreover, the present invention aims at providing a method for manufacturing an antistatic optical film enabling manufacture at low cost and outstanding productivity. Furthermore, the present invention aims at providing an image viewing display using the antistatic optical film.

As a result of wholehearted research made by the present inventors in order to solve the problems, it was found out that the object might be attained using a following antistatic optical film, thus leading to completion of the present invention.

That is, the present invention relates to an antistatic optical film comprising an antistatic layer laminated on at least one side of an optical film, wherein the antistatic layer comprises a water soluble or a water dispersible conductive polymers.

The present invention uses a water soluble or a water dispersible conductive polymer as a formation material of an antistatic layer, which enables utilization of an aqueous solution or an aqueous dispersion including water soluble or water dispersible conductive polymers in formation of the antistatic layer, and does not require utilization of non-aqueous organic solvents. This can make formation of antistatic layer easier, without causing change In quality and deterioration of the optical films even in the case where the antistatic layer is formed on optical films such as polarizing plate that are soluble in non-aqueous organic solvent and have inferior organic solvent resistance. Moreover, use of the water soluble or the water dispersible conductive polymer enables adoption of applying methods such as a coating method, a dipping method and a spraying method, and also enables reduction of manufacturing cost as compared with methods such as a vacuum deposition method and a sputtering method, and improvement in productivity may be realized.

Here, the water solubility of the water-soluble conductive polymer means a case where solubility to 100 g of water is 5 g or more. A solubility of less than 5 g may disturb industrial coated film formation.

Solubility of the water-soluble conductive polymer to 100 g of water is desirably 20 to 30 g.

In the water dispersible conductive polymer, conductive polymer is dispersed in a shape of micro-particles. The aqueous dispersion has a low liquid viscosity, and enables thin film coating and furthermore it gives a uniform coated layer. In consideration of uniformity of an antistatic layer, a size of the micro-particle is preferably 1 μm or less.

In the present invention, the water soluble or the water dispersible conductive polymer is of polyaniline and/or polythiophene.

Moreover, a surface resistance value of the antistatic layer is preferably $1 \times 10^{12}$ Ω/□ or less, more preferably $1 \times 10^{10}$ Ω/□ or less, and still more preferably $1 \times 10^{9}$ Ω/□ or less. When the surface resistance value exceeds $1 \times 10^{12}$ Ω/□, sufficient antistatic function may not be obtained, static electricity is generated and charged in peeling a surface protective film, and circuits, such as an LCD panel, may be destroyed by this static electricity.

In the antistatic optical film of a preferable embodiment of the present invention, a pressure sensitive adhesive layer is laminated on another side of a surface having the optical film of the antistatic layer. When adhering the optical film to a liquid crystal cell etc., a pressure sensitive adhesive is usually used. In such a case, in consideration of advantages, as drying stage not required for fixing the optical film, a configuration may preferably be adopted in which the optical film of pressure sensitive adhesive type having a pressure sensitive adhesive is beforehand prepared on one side thereof as a pressure sensitive adhesive layer.

In the antistatic optical film, the above-mentioned pressure sensitive adhesive layer is preferably formed of an acrylic pressure sensitive adhesive.

In the antistatic optical film, the optical film preferably comprises a polarizing plate.

In the antistatic optical film, as materials of an optical film surface having an antistatic layer laminated thereto, polycarbonates or norbornene resins may conveniently be used. As mentioned above, as formation materials of the antistatic layer, utilization of the water soluble or the water dispersible conductive polymers does not require use of organic solvents in a coating process, but can suppress change in quality of the polycarbonates or the norbornene resins.

Moreover, an activation treatment is preferably given to the optical film in the antistatic optical film. By giving the activation treatment to the optical film, repellent in forming the antistatic layer in the optical film may be controlled, enabling easy formation of coated film, and moreover formation of an antistatic layer having excellent adhesion to the optical film.

The present invention is related to a method for manufacturing an antistatic optical film comprising an antistatic layer at least one side of an optical film, the method comprising steps for forming the antistatic layer by applying an aqueous solution or an aqueous dispersion including a water soluble or a water dispersible conductive polymer on the optical film and for drying.

Moreover, the present invention relates to an image viewing display comprising at least one of the antistatic optical films. In the antistatic optical film of the present invention, according to various kinds of utilization embodiments of the image viewing displays, such as liquid crystal display, one film may be used independently or a plurality of films may be used in combination.

As image viewing displays adopting the antistatic optical film, liquid crystal displays having a liquid crystal cell in IPS mode or in VA mode are suitable. The antistatic optical film is prepared on one side or on both sides of the liquid crystal cell. Since the liquid crystal cell does not usually have conductive layers such as ITO on one side and antistatic treatment is not given, application of the film to a side without a conductive layer is in particular suitable.

DESCRIPTION OF THE PREFERRED EMBODIMENTS

Water soluble or water dispersible conductive polymers for forming the antistatic layer of the antistatic optical film of the present invention are not especially limited, as long as they are conductive polymers satisfying the above-mentioned definition of water solubility or water dispersibility, but well-known conductive polymers may be used. Polyaniline based, polythiophene based, polyethyleneimine based, allylamine based compounds, etc. are specifically mentioned, and polyanilines and/or polythiophenes are preferably used.

A weight average molecular weight expressed in terms of polystyrene of polyanilines is preferably 500000 or less, and more preferably 300000 or less. A weight average molecular weight expressed in terms of polystyrene of polythiophenes is preferably 400000 or less, and more preferably 300000 or less. When the weight average molecular weight exceeds the values, there may be shown a tendency for the definition of water solubility or water dispersibility to no longer be satisfied, and an aqueous solution for antistatic layer formation prepared using such polymers makes solid materials included therein of the polymers remain in the aqueous solution or aqueous dispersion, or it raises a viscosity, and as a result there is shown a tendency for formation of antistatic layer having a uniform thickness to be difficult.

Moreover, the polyanilines, polythiophenes, etc. preferably have a hydrophilic functional group in a molecule thereof. As hydrophilic functional groups, for example, there may be mentioned: sulfo group, amino group, amido group, imino group, quarternary ammonium salt group, hydroxyl group, mercapto group, hydrazino group, carboxyl group, sulfate group (—O—SO$_3$H), and phosphate group (O—PO(OH)$_2$ etc.), or salts of the above-mentioned groups. Introduction of hydrophilic functional groups into the molecule improves water solubility of the molecule, and also makes preparation of the water soluble or the water dispersible conductive polymer easier.

As examples of commercially available water-soluble conductive polymers, a polyaniline sulfonic acid (manufactured by Mitsubishi Rayon Co., Ltd., weight average molecular weight expressed in terms of polystyrene 150000) etc. may be mentioned. As examples of commercially available water dispersible conductive polymers, a polythiophene based conductive polymer (manufactured by Nagase Chemtech Co., Ltd., trade name, Denatron series) etc. may be mentioned.

A coating liquid for forming the antistatic layer may be prepared as an aqueous solution or an aqueous dispersion of the water-soluble conductive polymer or the water dispersible conductive polymer. The coating liquid does not require utilization of non-aqueous organic solvents, and can suppress change in quality of an optical film base material by the organic solvents. In consideration of adhesive properties of the aqueous solution or the aqueous dispersion, utilization of only water as solvents is preferable. In addition, the aqueous solution or the aqueous dispersion may include aqueous solvents as a hydrophilic solvent. For example, there may be mentioned: alcohols, such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol and cyclohexanol.

Figure 1:
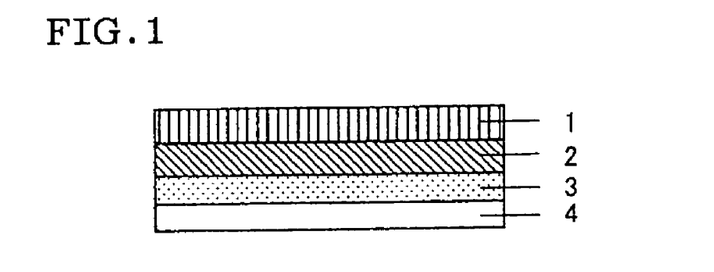
FIG. 1 is a sectional view of an antistatic optical film of the present invention.

In an antistatic optical film of the present invention, as shown in FIG. 1, an antistatic layer 2 formed of a water soluble or a water dispersible conductive polymer is provided on an optical film 1. Moreover, a pressure sensitive adhesive layer 3 may be laminated on the antistatic optical film of the present invention. In FIGS. 1 to 4, a pressure sensitive adhesive layer 3 is laminated on another surface side of an antistatic layer 2. Other optical films may further be laminated on the pressure sensitive adhesive layer 3. A releasing sheet 4 may be formed on the pressure sensitive adhesive layer 3.

Figure 2:
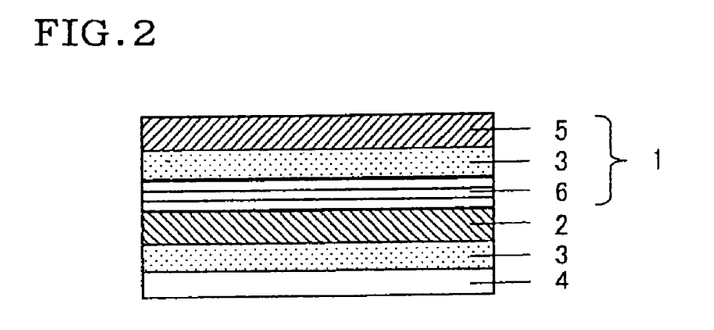
FIG. 2 is a sectional view of other antistatic optical films of the present invention.
Figure 3:
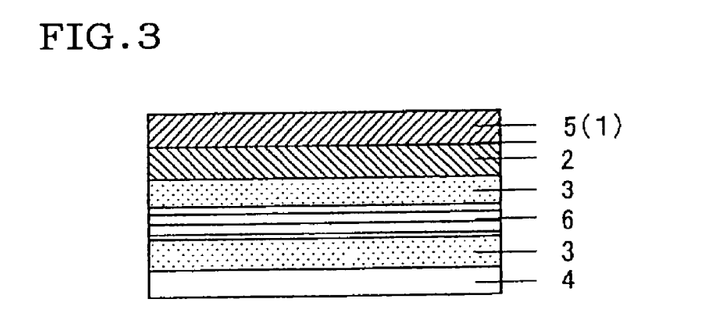
FIG. 3 is a sectional view of other antistatic optical films of the present invention, and is.
Figure 4:
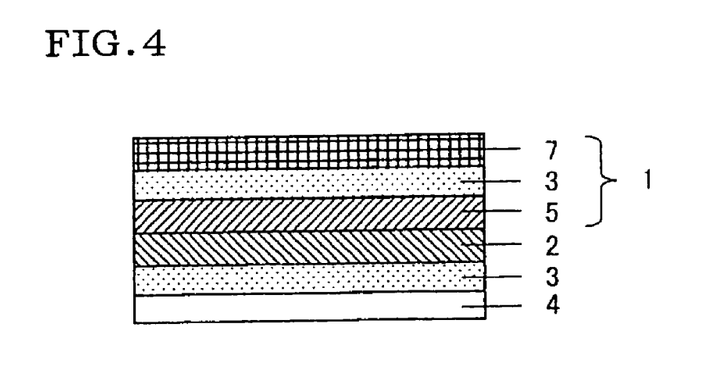
FIG. 4 is a sectional view of other antistatic optical films of the present invention.

It is preferable that an optical film 1 includes a polarizing plate 5. Moreover, the optical film 1 may include one or more kinds of optical films. FIGS. 2 to 4 are examples in the case where the optical film 1 includes the polarizing plate 5. An optical film 1 of FIG. 2 is a case where it has a polarizing plate 5 and a retardation plate 6. The polarizing plate 5 and the retardation plate 6 are attached through the pressure sensitive adhesive layer 3, and the antistatic layer 2 and the pressure sensitive adhesive layer 3 are formed on the retardation plate 6 side in this order. FIG. 3 is a case where an optical film 1 is a polarizing plate 5, and an antistatic layer 2 and a pressure sensitive adhesive layer 3 are laminated on a polarizing plate 5 in this order, and furthermore, a retardation plate 6 and a pressure sensitive adhesive layer 3 are laminated on the pressure sensitive adhesive layer 3. An optical film 1 of FIG. 4 is a case where it has a polarizing plate 5 and a reflective plate 7. The polarizing plate 5 and the reflective plate 7 are attached through a pressure sensitive adhesive layer 3, and an antistatic layer 2 and the pressure sensitive adhesive layer 3 are formed on a polarizing plate 5 side in this order.

As optical films 1, films used for formation of image viewing displays, such as liquid crystal displays, may be used, and kinds are not especially limited. For example, polarizing plates may be mentioned as optical films. As polarizing plates, in general a polarizing plate having transparent protective film one side or both sides of a polarizer is used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the protective film prepared on one side or both sides of the polarizer, materials is excellent in transparency, mechanical strength, heat stability, water shielding property, isotropy, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in side chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protection film, which can be determined arbitrarily, is 500 μm or less, preferably 1 through 300 μm, and especially preferably 5 through 300 μm in viewpoint of strength, work handling and thin layer.

Moreover, it is preferable that the protective film may have as little coloring as possible. Accordingly, a protective film having a phase difference value in a film thickness direction represented by $Rth=[(nx+ny)/2-nz] \times d$ of −90 nm through +75 nm (where, nx and ny represent principal indices of refraction in a film plane, nz represents refractive index in a film thickness direction, and d represents a film thickness)

may be preferably used. Thus, coloring (optical coloring) of polarizing plate resulting from a protective film may mostly be cancelled using a protective film having a phase difference value (Rth) of −90 nm through +75 nm in a thickness direction. The phase difference value (Rth) in a thickness direction is preferably −80 nm through +60 nm, and especially preferably −70 nm through +45 nm.

As a protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. Adhesives are used for adhesion processing of the above described polarizer and the protective film. As adhesives, isocyanate derived adhesives, polyvinyl alcohol derived adhesives, gelatin derived adhesives, vinyl polymers derived latex type, aqueous polyurethane based adhesives, aqueous polyesters derived adhesives, etc. may be mentioned.

A hard coat layer may be prepared, or antireflection processing, processing aiming at sticking prevention, diffusion or anti glare may be performed onto the face on which the polarizing film of the above described protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

An optical film of the present invention is especially no limitation about the optical layers, which may be used for formation of a liquid crystal display etc., such as a reflector, a transflective plate, a retardation plate (a half wavelength plate and a quarter wavelength plate included), and a viewing angle compensation film, may be used.

Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called ¼ plate) is used. Usually, half-wavelength plate (also called ½ plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection.

As retardation plates, birefringent films obtained by uniaxially or biaxially stretched polymer materials, oriented films of liquid crystal polymers, oriented layers of liquid crystal polymers currently supported with films may be mentioned. A thickness of the retardation plate is also not especially limited, and it is about 20 to 150 μm in general.

As polymer material, for example, there may be mentioned: polyvinyl alcohols, polyvinyl butyrals, polymethyl vinyl ethers, polyhydroxy ethyl acrylates, hydroxyethyl celluloses, hydroxy propyl celluloses, methyl celluloses, polycarbonates, polyallylates, polysulfones, polyethylene terephthalates, polyethylene naphthalates, polyethersulfones, polyphenylene sulfides, polyphenylene oxides, polyallyl sulfones, polyamides, polyimides, polyolefins, polyvinyl chlorides, cellulose type polymers, and norbornene based resins, or binary or ternary copolymers, graft copolymers, and blend object thereof. These polymer materials are stretched to obtain an oriented object that is stretched film.

As liquid crystalline polymers, for example, various kinds of polymers of principal chain type and side chain type in which conjugated linear atomic groups (mesogens) conferring liquid crystalline orientation are introduced into a principal chain and a side chain of a polymer may be mentioned. As examples of principal chain type liquid crystalline polymers, polymers having a structure where mesogen groups are bonded by spacer parts conferring flexibility, for example, polyester based liquid crystalline polymers having nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain skeleton, and having mesogen parts comprising para-substituted cyclic compound units conferring nematic orientation property as side chains via spacer parts comprising conjugated atomic groups may be mentioned. These liquid crystal polymer, for example, is aligned by developing a solution of a liquid crystal polymer on an orientation treated surface where rubbing treatment was performed to a surface of thin films, such as polyimide and polyvinyl alcohol, formed on a glass plate, or where silicon oxide is deposited by an oblique evaporation method, and then by heat-treating.

Retardation plates that have suitable phase difference depending on the purpose of use, such as aiming at compensation of coloring or viewing angle using birefringence, for example, various wavelength plates and liquid crystal layers, may be used. In addition retardation plates in which two or more kinds of retardation plates are laminated together to control optical properties, such as phase difference may be used.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a bidirectional stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

As formation methods of an antistatic layer 2 formed of a water soluble or a water dispersible conductive polymer onto the optical film 1, there may be mentioned methods in which a coating liquid (aqueous solution or aqueous dispersion) including a water soluble or a water dispersible conductive polymer is applied on an optical film 1 using applying methods, such as a coating method, a dipping method, and a spraying method, and then is dried. Although a content of the water soluble or the water dispersible conductive polymer in the coating liquid is not especially limited, but it is preferably about 0.2 to 30% by weight, and more preferably about 0.2 to 5% by weight. Less than 0.2% by weight of content needs excessive period of time for removing water in a drying stage, and unprofitably reduces manufacturing efficiency. On the other hand, a content exceeding 30% by weight excessively raises a viscosity of the aqueous solution, decreases coating property, and a tendency for uniform coating on the optical film to be difficult is shown.

A thickness of an antistatic layer is preferably 5 to 1000 nm. A thickness of the antistatic layer is preferably 5 nm or more from a viewpoint of reservation of adhesive properties, and inhibition of separation electrification, and more preferably 10 nm or more. On the other hand, a thickness of the antistatic layer is usually 1000 nm or less from a viewpoint of decrease in optical characteristics. When a thickness of the antistatic layer becomes thicker, shortage of strength of the water soluble or the water dispersible conductive polymer tends to induce rupture within the antistatic layer, which may disable reservation of sufficient adhesive properties. A thickness of the antistatic layer is 1000 nm or less, preferably 500 nm or less, and more preferably 200 nm or less. Although the separation electrification effect is more effectively suppressed with greater thickness of the antistatic layer, even if exceeding 200 nm, an effect of increase in thickness will be saturated. For this reason, it is 5 to 1000 nm, preferably 10 to 500 nm, and more preferably 10 to 200 nm.

Activation treatment may be given to an optical film 1 in formation of an antistatic layer 2. Various kinds of methods may be adopted as activation treatments, such as a corona treatment, a low-pressure UV treatment, a plasma treatment, etc. In the case where the optical film 1 is of polyolefin based resins and norbornene based resins, the activation treatment is especially effective, which can suppress repellent in case of coating of the aqueous solution or the dispersion including the water soluble or the water dispersible conductive polymer.

A pressure sensitive adhesive layer 3 may be formed on another surface side having an optical film 1 of the antistatic layer 2. The pressure sensitive adhesive layer 3 may be attached on other optical films, liquid crystal cells, etc.

As pressure sensitive adhesive that forms adhesive layer 3 is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Formation of the pressure sensitive adhesive layer 3 is performed by lamination onto the above-mentioned antistatic layer 2. Formation methods are not especially limited, and there may be adopted: a method in which a pressure sensitive adhesive (liquid) is applied onto an antistatic layer 2, and then is dried; and a method of transfer using a releasing sheet 4 having a pressure sensitive adhesive layer 3 formed thereon etc. A thickness of the pressure sensitive adhesive layer 3 (thickness in a dried state) is not especially limited; it is preferably about 10 to 40 μm.

As components of the releasing sheet 4, there may be mentioned suitable sheeted materials: papers; synthetic resin films, such as polyethylenes, polypropylenes, and polyethylene terephthalates; rubber sheets; papers; cloths; nonwoven fabrics; nets; foamed sheets; metallic foils; and laminated materials of the above-mentioned materials, etc. In order to increase releasability from the pressure sensitive adhesive layer 3, releasing treatment giving low adhesive properties, such as a siliconization, a long chain alkyl treatment, and a florine treatment, may be performed to a surface of the releasing sheet 4 if needed.

In addition, in the present invention, ultraviolet absorbing property may be given to the above-mentioned each layer, such as antistatic optical film, an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An antistatic optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an optical film by the present invention is used, there is especially no limitation to use any conventional methods. Also any liquid crystal cell of arbitrary type, such as TN type, and STN type, p type may be used. And above-mentioned IPS type, VA type may be used.

Suitable liquid crystal displays, such as liquid crystal display with which the above-mentioned antistatic optical film has been located at one side or both sides of the liquid crystal cell, and with which a backlight or a reflector is used for a lighting system may be manufactured. In this case, the antistatic optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., an emitting layer comprising fluorescent organic solids, such as anthracene; a laminated material of electronic injection layer comprising such an emitting layer and perylene derivatives, etc.; laminated material of these hole injection layers, emitting layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, a very thin film about 10 nm forms an organic emitting layer in thickness. For this reason, light is transmitted nearly completely through organic emitting layer as through transparent electrode. Consequently, since the light that enters, when light is not emitted, as incident light from a surface of a transparent substrate and is transmitted through a transparent electrode and an organic emitting layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to p/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Although concrete description will be given hereinafter with reference to Examples of the present invention, the present invention is not limited to them.

(Surface Resistance Value)

A surface resistance value of an antistatic layer was measured for using a surface resistance-measuring instrument (made by Mitsubishi Chemical Corporation, Hiresta MCP-HT450).

(Amount of Separation Electrification)

An obtained optical film was cut into a shape of strip having a dimension of 70 mm×100 mm, a releasing sheet A was peeled off and a pressure sensitive adhesive layer was attached onto a glass plate. Under a condition of 23° C./50% R.H., a surface protective film was peeled at a fixed rate of 5 m/minute in a direction making 180°. An amount of electrification (kV) of the optical film surface immediately after peeling was measured with a digital electrostatic electric potential measuring instrument (made by Kasuga Electric Works, Ltd., KSD-0103). In addition, a peeling force of the surface protective film gave not more than 1 N/25 mm.

(Appearance)

An obtained optical film was disposed on a back light with luminance of 10000 cd, and observation of appearance by visual inspection was performed. At this time, one optical film or two optical films were disposed in a cross-Nicole arrangement, to perform observation.

○: Optical film (antistatic layer) surface does not have unevenness, but has uniformity.

x: Optical film (antistatic layer) surface has unevenness, adversely affecting display properties.

(Disorder of Display)

A liquid crystal cell in IPS mode in which ITO treatment was given to a glass substrate on a front side, and an ITO treatment was not given to a glass substrate on a back side was used. A releasing sheet A was peeled from an optical film, and a pressure sensitive adhesive layer was attached on a back side of the liquid crystal cell concerned. A surface where this liquid crystal panel was attached was disposed on a back light so as to be upper side. Subsequently, the surface protective film on the optical film surface was peeled at a fixed rate of 5 m/minute in a direction making 180°, and disorder of liquid crystal layer was observed. In evaluation, a time of period until disorder of the liquid crystal layer returns to an original state was measured.

Example 1

An aqueous solution including a polyaniline sulfonic acid (weight average molecular weight expressed in terms of polystyrene 150000 by Mitsubishi Rayon Co., Ltd., PAS) 1.0% by weight was applied on one side of a retardation plate (80 μm) made of a uniaxially stretched norbornene based resin (manufactured by JSR, Arton) having corona treatment given to a surface thereof. Obtained retardation plate was dried for 2 minutes with 80° C. warm air dryer, and an antistatic layer (0.5 μm in thickness) was formed. And a pressure sensitive adhesive layer of a pressure sensitive adhesive sheet having a pressure sensitive adhesive layer (25 μm in thickness, acrylic based pressure sensitive adhesive) currently formed on a releasing sheet A (a PET sheet with silicone releasing treatment given to one side thereof) was attached on the antistatic layer.

On the other hand after a polyvinyl alcohol film with a thickness of 80 μm was stretched by 5 times in an iodine aqueous solution at 40° C., it was dried for 4 minutes at 50° C. to obtain a polarizer. Using a polyvinyl alcohol based adhesive, triacetyl cellulose films were adhered on both sides of this polarizer to obtain a polarizing plate. And a pressure sensitive adhesive layer (25 μm in thickness) made of an acrylic based pressure sensitive adhesive was formed on one side of the polarizing plate to produce a pressure sensitive adhesive type polarizing plate. A pressure sensitive adhesive layer of the pressure sensitive adhesive type polarizing plate was attached on other surface side of the retardation plate, and furthermore, a surface protective film (releasing-sheet B: PET, 38 μm in thickness; pressure sensitive adhesive layer: acrylic based pressure sensitive adhesive, 20 μm in thickness) was attached on other surface side of the polarizing plate, and an antistatic optical film (antistatic type elliptically polarizing plate) was produced.

Example 2

A polythiophene based conductive polymer (manufactured by Nagase Chemtech Co., Ltd., trade name, Denatron P502RG) was diluted with a mixed solvent of water/isopropyl alcohol (50/50: by weight) to prepare a coating liquid with a controlled concentration of 1.0% by weight. The coating liquid concerned was applied to one side of the polarizing plate produced in Example 1, dried for 2 minutes with 80° C. warm air dryer to form an antistatic layer (0.1 μm in thickness). Furthermore a same method as in Example 1 was repeated, and a pressure sensitive adhesive layer was formed on the antistatic layer concerned to produce an antistatic optical film (antistatic type polarizing plate).

Comparative Example 1

Except for not having prepared an antistatic layer in Example 1, a same method as in Example 1 was repeated to produce an optical film (elliptically polarizing plate).

Comparative Example 2

Except that in Example 1 a toluene solution including ATO micro-particles and a UV curable acrylic urethane resin (5% by weight) was applied to one side of a retardation plate, and was dried for 2 minutes with 80° C. warm air dryer, and then UV was irradiated to form an antistatic layer (thickness 3.0 μm), a same method as in Example 1 was repeated to produce an antistatic optical film (antistatic type elliptically polarizing plate).

TABLE 1

| | Surface resistance value ($\Omega/\square$) | Amount of separation electrification (kv) | Appearance | Disorder of display |
|---|---|---|---|---|
| Example 1 | $3 \times 10^9$ | 0.2 | ○ | <3 seconds |
| Example 2 | $1 \times 10^8$ | 0.1 | ○ | <1 second |
| Comparative Example 1 | $>1 \times 10^{13}$ | 1.5 | ○ | >=30 minutes |
| Comparative Example 2 | $5 \times 10^9$ | 0.3 | X | <3 seconds |

An antistatic optical film of the present invention has a small amount of separation electrification, and an outstanding appearance as clearly shown in Table 1.

What is claimed is:

1. A method for manufacturing an antistatic optical film comprising an antistatic layer at least one side of a liquid crystal display optical film, comprising the steps of:
    applying an aqueous solution comprising a water soluble conductive polymer on and in contact with the optical film, wherein the water soluble conductive polymer is a polythiophene;
    drying to form the antistatic layer; and
    applying a pressure sensitive adhesive layer on another side of the antistatic layer.

2. The method claim 1, wherein the polythiophene contains a hydrophilic functional group in a molecule.

3. The method claim 1, wherein a surface resistance value of the antistatic layer is $1 \times 10^{12}$ $\Omega/\square$ or less.

4. The method claim 1, wherein the pressure sensitive adhesive layer is formed of an acrylic pressure sensitive adhesive.

5. The method claim 1, wherein the optical film comprises a polarizing plate.

6. The method claim 1, wherein a surface material of the optical film on which the antistatic layer is laminated is a polycarbonate or a norbornene resin.

7. The method claim 1, further comprising activation treatment of the optical film.

8. The method claim 1, wherein the water soluble conductive polymer has a solubility of 20-30 g per 100 g of water.

9. The method of claim 5, wherein said polarizing plate comprises a polarized element and a transparent protective film, wherein said/an antistatic layer is applied on and in contact with said transparent protective film, and wherein said transparent protective film consists of a material selected from the group consisting of polyethylenenaphthalate, acrylic polymer, styrene polymer, polycarbonate polymer, polyolefin polymer, vinyl chloride polymer, amide polymer, imide polymer, sulfone polymer, polyether sulfone polymer, polyether-ether ketone polymer, poly phenylene sulfide polymer, vinyl alcohol polymer, vinylidene chloride polymer, vinyl butyral polymer, allylate polymer, polyoxymethylene polymer, epoxy polymer, and a blend of the aforementioned polymers.

10. The method of claim 6, wherein the optical film comprises a retardation plate.

11. The method of claim 1, wherein the antistatic optical film is applied to a first side of a liquid crystal display, wherein said first side of the liquid crystal display does not have a conductive layer, wherein the liquid crystal display has a liquid crystal cell in IPS mode or VA mode.

12. The method of claim 11, wherein a second side of the liquid crystal display has a conductive layer.

13. A method for manufacturing an antistatic optical film comprising an antistatic layer at least one side of a liquid crystal display optical film, comprising:

applying an aqueous solution comprising a water soluble conductive polymer on and in contact with the optical film, wherein the water soluble conductive polymer is a polythiophene, and wherein the optical film has optical properties which are deteriorated if an organic solvent is applied on and in contact with the optical film;

drying to form the antistatic layer; and applying a pressure sensitive adhesive layer on another side of the antistatic layer.

* * * * *

UNITED STATES PATENT AND TRADEMARK OFFICE
CERTIFICATE OF CORRECTION

PATENT NO. : 7,413,766 B2  Page 1 of 1
APPLICATION NO. : 10/824797
DATED : August 19, 2008
INVENTOR(S) : Masayuki Satake et al.

It is certified that error appears in the above-identified patent and that said Letters Patent is hereby corrected as shown below:

At Column 2, Line 57, please delete "In" and insert --in--, therefor.

At Colum 4, Line 51, delete "quarternary" and insert --quaternary--, therefor.

At Column 18, Line 35, in Claim 2, before "claim" please insert --of--.

At Column 18, Line 37, in Claim 3, before "claim" please insert --of--.

At Column 18, Line 40, in Claim 4, before "claim" please insert --of--.

At Column 18, Line 43, in Claim 5, before "claim" please insert --of--.

At Column 18, Line 45, in Claim 6, before "claim" please insert --of--.

At Column 18, Line 48, in Claim 7, before "claim" please insert --of--.

At Column 18, Line 50, in Claim 8, before "claim" please insert --of--.

Signed and Sealed this

Twenty-eighth Day of April, 2009

JOHN DOLL
*Acting Director of the United States Patent and Trademark Office*